Sept. 7, 1943.  N. J. CAFARELLI, JR  2,328,546
FLUID VELOCITY INDICATOR
Filed Nov. 18, 1941  3 Sheets-Sheet 1

INVENTOR
NICHOLAS J. CAFARELLI, JR.,
BY
ATTORNEYS

Sept. 7, 1943.  N. J. CAFARELLI, JR  2,328,546
FLUID VELOCITY INDICATOR
Filed Nov. 18, 1941  3 Sheets-Sheet 2
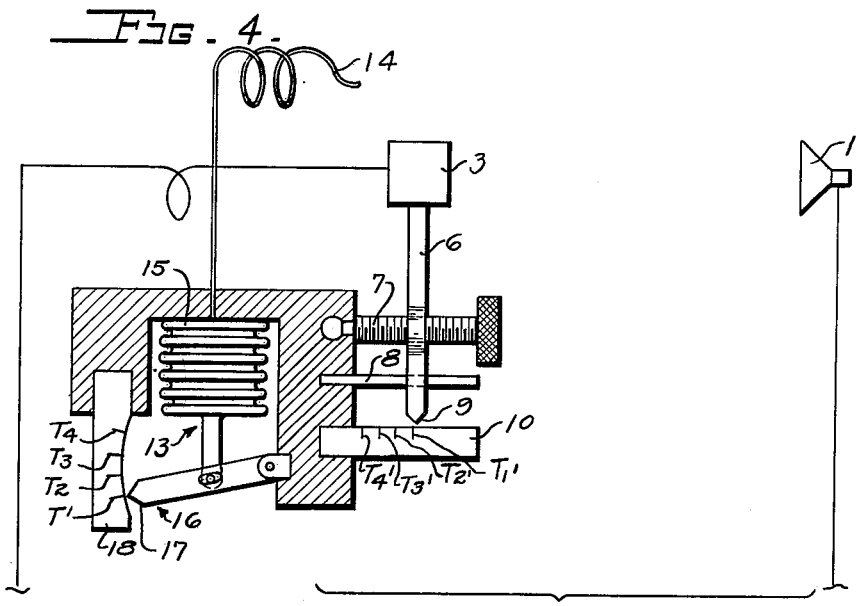
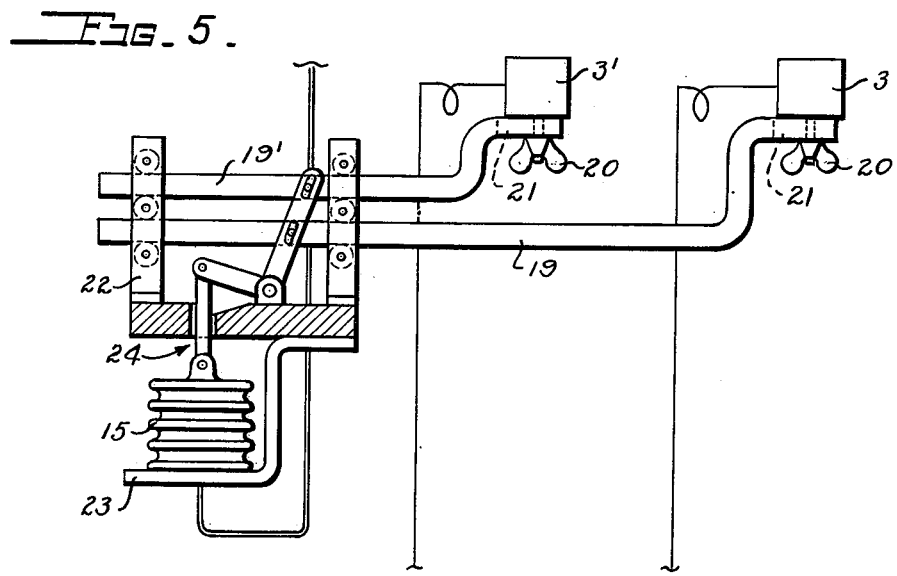
INVENTOR
NICHOLAS J. CAFARELLI, JR.
BY
ATTORNEYS

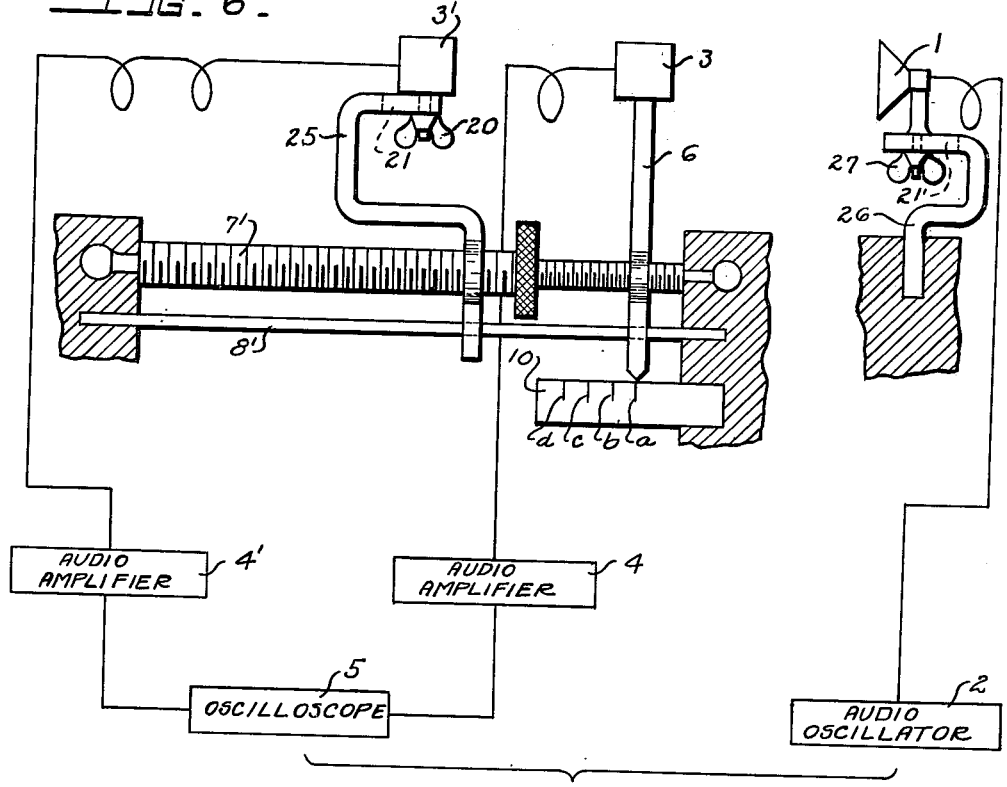
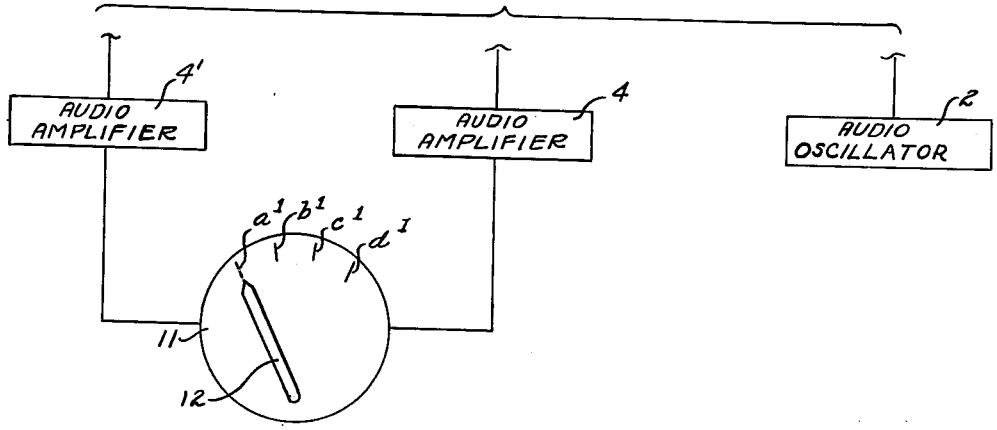

Patented Sept. 7, 1943

2,328,546

UNITED STATES PATENT OFFICE 2,328,546

FLUID VELOCITY INDICATOR

Nicholas J. Cafarelli, Jr., Buffalo, N. Y.

Application November 18, 1941, Serial No. 419,614

14 Claims. (Cl. 73—194)

(Granted under the act of March 3, 1883, as amended April 30, 1928; 370 O. G. 757)

The invention described herein may be manufactured and used by or for Government for governmental purposes, without the payment to me of any royalty thereon.

Known means for indicating the velocity of a fluid medium moving past a fixed point of observation or the velocity of a moving observation point relative to a fluid medium through which it is passing are subject to certain inaccuracies brought about by atmospheric changes which require the application of several well-known compensative measures.

It is a primary object of this invention to provide an indicator capable of giving true fluid velocity when operating in an isothermal atmosphere without the necessity of secondary compensation.

Another object of this invention is to provide an indicator incorporating such automatic or manual temperature correction that it gives true fluid velocity under all atmospheric conditions.

The novel diagram and apparatus selected for the purpose of explaining and illustrating the broad principles of this invention are shown in the accompanying drawings, in which.

Figure 2:
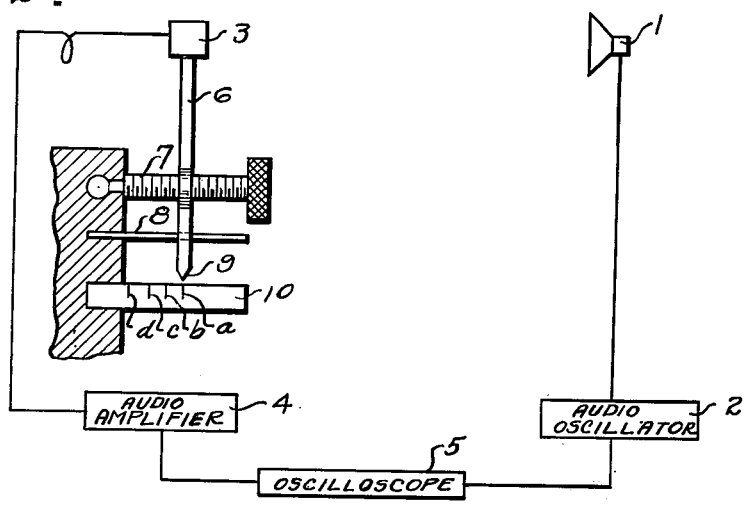
Fig. 2 is a side elevation of one form of my invention.
Figure 3:
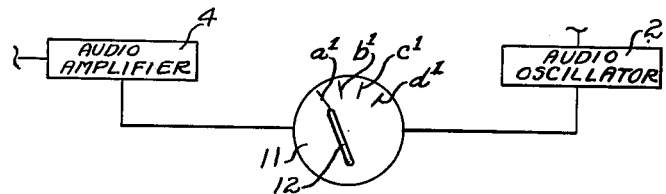

Except for oscilloscope replacement by a phasemeter, the parts of Figs. 3 and 2 are assumed to be identical;

Fig. 4 shows a modification incorporating provision for temperature correction;

Fig. 5 illustrates application of automatic temperature correction to dual microphone reception;

Fig. 6 represents minor alteration of the parts showing of Fig. 2 in combination with certain new part additions; and Fig. 7 merely replaces the oscilloscope of Fig. 6 with the phasemeter of Fig. 3.

The subject invention makes use of sonic effects set up in a fluid medium for the purpose of indicating velocity variations therein through the measuring of corresponding shifts in the phase of constant-frequency sound vibrations existing between two points in the line of fluid flow. By way of simple illustration, let it be assumed that a point of sound reception R is set up in a motionless fluid medium an even multiple of one wave length away from a point T which is emitting constant-frequency sound vibrations. Thereafter, assuming the aforesaid two points to be some such distance as three wave lengths apart and transposing the whole into the diagrammatic showing of Fig. 1, the sound wave $w^3$ is seen to pass directly through the point R; i. e., the sound wave $w^3$ is represented as being completely in phase with the point of sound reception R.

Figure 1:
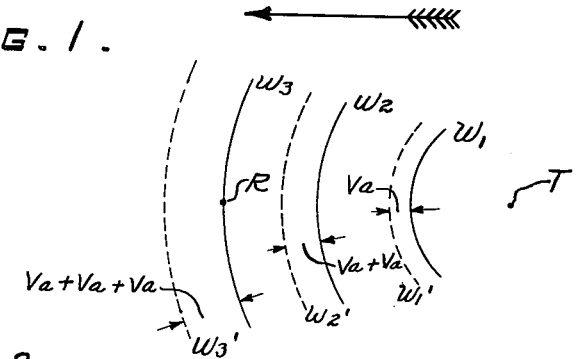
Fig. 1 is a diagram illustrating certain sonic effects set up in a fluid medium.

Let it next be assumed that the fluid medium surrounding the points T and R is caused to move at some fixed velocity in the direction of the arrow shown in Fig. 1. Addition of this new fluid velocity differential to the initial velocity of the sound waves leaving the point T under motionless fluid conditions will cause the initial sound waves $w^1$, $w^2$, and $w^3$ to assume the new wave positions $w^{1'}$, $w^{2'}$, and $w^{3'}$. It is readily apparent that the new wave position $w^{3'}$ is now materially out of phase with the point of sound reception R. The same phase shift between the points T and R will occur if, instead of causing the fluid medium to move relative to stationary points T and R, the said points T and R are caused to move relative to the fluid medium. A one-hundred-and-eighty-degree reversal of the fluid flow or points movement described immediately above would merely result in like decreasings of the new wave positionings $w^{1'}$, $w^{2'}$, and $w^{3'}$ to the right, respectively, of the initial wave positionings $w^1$, $w^2$, and $w^3$. The significance of the additional symbols $V_s$ and $V_a$ is fully explained hereinbelow.

The present invention proposes to reduce the above-referred-to phenomenon to practical use. One such reduction is illustrated in Fig. 2. Constant-frequency sound vibrations are provided by means of a speaker 1 operably interconnected with an audio oscillator 2. Reception of the above sound vibrations is accomplished by a microphone 3 operably interconnected with an audio amplifier 4. An oscilloscope 5 is lastly operably interconnected with the audio amplifier 4 and the audio oscillator 2 for the purpose of determining when some preselected constant-frequency sound wave, such as the sound wave $w^3$ of Fig. 1, is exactly in phase with the microphone 3. It will be noted that the microphone 3 is mounted upon a standard 6, which standard is in turn supported by an adjusting screw 7 and a guide rod 8. The lowermost extremity of the standard 6 terminates in a pointer 9 adapted to be registered with certain hereinafter-referred-to graduations $a$ through $d$ shown upon a scale 10 located immediately beneath and fixed with respect to the guide rod 8.

Assuming that the fluid medium under observation is at all times maintained at some preselected constant temperature and that the frequency of the audio oscillator 2 is never permitted to vary from some equally preselected constant, the operation of the apparatus shown in Fig. 2 is as follows: Let it be initially assumed that the scale 10 is devoid of markings, that the spacing between the speaker 1 and the microphone 3 fairly closely approximates "an even multiple of one wave length," and that the fluid surrounding the apparatus is motionless. By appropriate clockwise or counterclockwise manipulation of the adjusting screw 7 and careful observation of the screen portion of the oscilloscope 5, the microphone 3 is brought exactly in phase with the constant-frequency sound vibrations being emitted by the speaker 1. With the tip of pointer 9 as a reference point, the graduation of $a$ is thereupon inscribed upon the scale 10.

Let it be next assumed that the fluid medium surrounding the apparatus of Fig. 2 is caused to move at a constant velocity X from right to left in approximate alignment with the speaker 1 and microphone 3. Reference to the screen portion of the oscilloscope 5 now indicates that the constant-frequency sound vibrations being emitted by the speaker 1 are clearly out of phase with the microphone 3. Assuming incorporation of a right-hand thread upon the screw 7, careful counterclockwise manipulation thereof will gradually bring the microphone 3 into desired in-phase condition. The graduation $b$ is thereupon inscribed upon the scale 10.

The operation described in the preceding paragraph is repeated as many times as it is desired to obtain additional graduations representing further multiples of the aforesaid constant velocity X. The showing of Fig. 2 is limited to two additional graduations $c$ and $d$ representing, respectively, constant velocities 2X and 3X. From the foregoing, it becomes at once evident to those skilled in the art that the apparatus of Fig. 2 can be directly applied to the velocity control of wind tunnels maintaining relatively constant air temperatures.

While duplicating all but one of the apparatus parts of Fig. 2, the second embodiment of the subject invention incorporates certain distinctively new operating features. In Fig. 3 the former oscilloscope 5 is replaced by a phasemeter 11 operatively interconnected with the audio amplifier 4 and the audio oscillator 2. Assuming an exact continuation of the fluid medium and audio oscillator conditions stated in connection with Fig. 2 and that the "face" of the phasemeter 11 is initially devoid of markings, the pointer 9 of the standard 6 is carefully returned into exact registration with the graduation $a$ of the scale 10. Under such conditions, the microphone 3 is completely in phase with the constant-frequency sound vibrations being emitted by the speaker 1 (i. e., under condition of zero fluid velocity). With the tip of a pointer 12 as a reference point, a graduation $a^1$ is thereupon inscribed upon the "face" of the phasemeter 11.

As was previously the case in connection with Fig. 2, let it again be assumed that the fluid medium is next caused to move from right to left at a constant velocity X. The pointer 12 is thereupon observed to have assumed a new position slightly clockwise of the location shown in Fig. 3, it being a designed function of the phasemeter 11 to register varying degrees of out-of-phase condition in terms of angular displacement (of the pointer 12). The graduation $b^1$ is thereupon inscribed upon the "face" of the phasemeter 11.

As was also the case in connection with Fig. 2, the operation of the preceding paragraph is repeated as many times as it is desired to add additional velocity markings. To one skilled in the art, it becomes at once evident that such resulting graduations as $a^1$ through $d^1$ are capable of much broader usage than are the graduations $a$ through $d$ of Fig. 2. Once calibrated, the phasemeter 11 is entirely self-indicating, which greatly simplifies its application to the velocity control of wind tunnels maintaining relatively constant air temperature. The aforesaid self-indicating characteristic of the phasemeter 11 also permits new and direct usage of the apparatus of Fig. 3 for the purpose of determining the velocity of a vehicle moving in a motionless fluid medium, which usage is fully described hereinbelow.

Thus far, application of the apparatuses of Figs. 2 and 3 has been limited to fluid mediums maintained at a predetermined constant temperature. However, all that is required to make the apparatus of Fig. 3 equally applicable to a fluid medium subject to temperature change is the single addition of a pressure type free-air thermometer for indicating the magnitude of temperature change and regraduation of the duplicate scale markings of Figs. 2 and 3 in terms of temperature units. With the single exception of the altered graduations shown on the scale 10, Fig. 4 is assumed to employ an exact duplication of the apparatus parts of Fig. 3. In addition to the last-named parts, there is added a free-air thermometer 13 consisting of an exterior bulb 14, a pressure-responsive element 15, an indicator element 16 having a pointer 17, and a scale 18.

Let it be assumed that the scales 10 and 18 are initially devoid of markings and that a duplication of the sound vibrations and fluid temperature of Fig. 3 momentarily exists. Under such conditions, positioning of the pointer 9 is identical for both Fig. 3 and Fig. 4, and the presently shown position of the pointer 17 gives exact indication of the temperature of the motionless fluid medium surrounding the apparatus of Fig. 4. With the tips of the pointers 9 and 17 as reference points, the graduations $T^1$ and $T^{1\prime}$ are thereupon inscribed upon the scales 18 and 10, respectively. It should be here noted that the graduation $T^{1\prime}$ is superimposed directly upon and is therefore identical to the graduation $a$ appearing in Fig. 2.

During the operations set forth immediately below, it is assumed that the fluid medium surrounding the apparatus of Fig. 4 remains completely motionless. Temperature calibrations completed under such conditions are obviously directly usable for subsequent determination of moving fluid temperatures. Let it be next assumed that the fluid medium under observation undergoes a decrease of Y degrees in temperature. As a sole result of the foregoing, two happenings are noted. The tip of the pointer 12 moves out of its initial registration with the graduation $a^1$ upon the "face" of the phasemeter 11, indicating that the constant-frequency sound vibrations being emitted by the speaker 1 are out of phase with the microphone 3, and the tip of the pointer 17 simultaneously moves out of its initial registration with the graduation $T^1$ of the free-air thermometer 13 to further indicate that the fluid medium surrounding the apparatus of Fig. 4 now stands at $T^1$ degrees minus Y degrees or $T^2$ degrees temperature. Using the tip of the pointer 17 as a guide, the graduation $T^2$ is thereupon inscribed upon the scale 18. Thereafter, the tip of the pointer 12 is brought back into exact alignment with the graduation $a^1$ upon the "face" of the phasemeter 11 by bodily shifting the microphone 3 in a manner identical to that previously described in connection with Fig. 3 (i. e., by appropriate regulation of the adjusting screw 7).

The operations described in the preceding paragraph are repeated as many times as it is desired to obtain additional graduations representing further multiples of the aforesaid minus Y degrees temperature decrease. The showing of Fig. 4 is limited to two additional temperature graduations $T^3$ and $T^4$ (on the scale 18) representing, respectively, temperature decreases 2Y and 3Y, and to two further temperature-phase correction graduations $T^{3'}$ and $T^{4'}$ (on the scale 10). It is thus now possible to obtain true fluid velocity readings under conditions of constantly varying temperature by simply adjusting the pointer 9 into exact duplication with the reading of the pointer 17 immediately prior to observation of the phasemeter 11.

The next embodiment of the subject invention employs an element, the functions of which can be equally well performed by several different "forms" of mechanical movements. Therefore, it should be clearly understood that the "linkage" scheme shown in Fig. 5 is purely representatively schematic and is not intended to limit in any way actual usage of a more mechanically suited, though structurally complicated, mechanism. For the further purpose of avoiding unwarranted drawing repetition, Fig. 5 also includes joint disclosure of the above and an additional hereinafter-described embodiment of the subject invention. No confusion should result from the above for the reason that the separate disclosures of each embodiment clearly distinguish their own individual parts. Parts not shown in connection with the description of the present embodiment of the subject invention are fully covered by duplicate parts previously shown and described in connection with Figs. 3 and 4. Referring to the new part additions and old part rearrangements of Fig. 5, the microphone 3 is longitudinally adjustably secured to an L-shaped support 19 by means of a wing bolt 20 and slot 21. The microphone support 19 is in turn slidably mounted in a pair of roller equipped brackets 22. A second microphone 3' and microphone support 19' pertain exclusively to a later-described embodiment of the subject invention. The pressure-responsive element 15 of the free-air thermometer 13 is secured in an "upright" position by means of an L-shaped bracket 23. The aft portion of the microphone support 19 is interconnected with the free end of the pressure-responsive element 15 by means of a linkage 24. In actual practice, the linkage 24 would assume that "form" of mechanical movement deemed best suited to the purpose of obtaining satisfactory translation of temperature change into microphone support movement.

Only one adjustment of the moving parts of Fig. 5 is essential to place this latest embodiment of the subject invention in working order. Assuming exact duplication of the sound vibration and initial fluid temperature conditions of Fig. 3, and that the fluid medium surrounding the apparatus of Fig. 5 is motionless, the wing bolt 20 is loosened and the microphone 3 carefully moved to a point of longitudinal adjustment causing the tip of the pointer 12 to come into exact registration with the graduation $a^1$ on the "face" of the phasemeter 11. Following retightening of the wing bolt 20, all subsequent readings indicated by the phasemeter 11 will represent true fluid velocity regardless of change in fluid temperature. During the above, it is of course assumed that the second microphone 3' is completely inoperative (i. e., in effect, non-existent).

While determination of the in-phase or out-of-phase phenomenon incident to the operation of the apparatuses discussed in connection with Figs. 2 through 5 has so far been limited to usage of a single microphone, such limitation is not solely essential to the observation of the aforesaid phenomenon. There immediately follows disclosures of several additional embodiments of the subject invention employing two microphone-amplifier units arranged in tandem with respect to the speaker-oscillator unit. It is worthy of particular note that the last-named unit is no longer "operably interconnected" with either of the previously mentioned microphone-amplifier units. The reason for this latter change is fully explained hereinbelow.

The apparatus disclosed in Fig. 6 is intended to exactly duplicate the functions of previously described Fig. 2. Referring to new part additions and old part alterations, the central portion of Fig. 6 is merely the left-hand portion of Fig. 2 rotated one hundred and eighty degrees. The altered adjusting screw 7' and guide rod 8' now include left-hand extensions, the former of which incorporates a preselected multiple of the pitch of the original screw threads now shown to the right of the central adjusting knob for a purpose fully described hereinbelow. A new microphone 3' is longitudinally adjustably secured to a new support 25 by means of the wing bolt 20 and slot 21. The spacing between the microphones 3 and 3' is laboratory preadjusted such that it momentarily represents exactly one wave length (i. e., with reference to the constant-frequency sound waves being emitted by the speaker 1). In exact counter-association therewith, the pitch of the "left" screw thread is just double the pitch of the "right" screw thread of the adjusting screw 7'. The aforesaid microphone spacing may also be "any even multiple of one wave length," so long as appropriate counter-change is made between the two "pitches" of the adjusting screw 7'. In view of the necessity for momentary retention of the aforesaid microphone spacing, the speaker 1 is provided with longitudinal adjustment by means of a support 26, having a slot 21' and a new wing bolt 27. The microphone 3' is operably interconnected with a new audio amplifier 4'. The audio amplifiers 4 and 4' are in turn operably interconnected with the oscilloscope 5.

Assuming exact duplication of the sound vibration and initial fluid temperature conditions of Fig. 2, that the scale 10 is devoid of markings, and that the fluid medium surrounding the apparatus of Fig. 6 is motionless; the wing bolt 27 is loosened and the speaker 1 carefully moved to a point of longitudinal adjustment in which the now "twin" microphone unit 3—3' is exactly in phase with the constant-frequency sound vibration being emitted by the speaker 1. The aforesaid "adjustment" is readily attainable through careful observation of the screen portion of the oscilloscope 5. The above completed, the wing bolt 27 is retightened and the graduation $a$ inscribed upon the scale 10.

Let it be next assumed that the microphones 3 and 3' of Fig. 6 are exactly in phase, respectively, with the sound waves $w^1$ and $w^2$ of Fig. 1 and that the fluid medium surrounding the apparatus of Fig. 6 is caused to move from right to left in approximate alignment with the speaker-twin-microphone unit at the constant velocity X previously discussed in connection with Fig. 2. The $V_a$ (i. e., the velocity newly imparted to the "air") added to the $V_s$ (i. e., the constant velocity of the sound waves emitted by the speaker 1) will cause the above-mentioned sound wave $w^1$ to realign itself in the new wave positioning $w^{1\prime}$. In terms of "wave length," the distance from T to $w^{1\prime}$ now represents the sum of $V_s$ plus $V_a$; from T to $w^2$, the sum of $V_s$ plus $V_s$ added to the further sum of $V_a$ plus $V_a$; and from T to $w^{3\prime}$, the sum of $V_s$ plus $V_s$ plus $V_s$ added to the still further sum of $V_a$ plus $V_a$ plus $V_a$; resulting in the out-of-phase spacing between $w^{3\prime}$ and $w^3$ being three times greater, and the same spacing between $w^{2\prime}$ and $w^2$ being two times greater, than the same spacing between $w^{1\prime}$ and $w^1$. Thus, with the initial microphone spacing stated above, the microphone 3' must move two space units from right to left for each single space unit in like direction which the microphone 3 moves (if in-phase condition is to continue). If, however, the microphone 3' is initially spaced in phase with the sound wave $w^3$ (of Fig. 1), a three-to-one movement differential is required. Following the above in-phase adjustment and inscription of a graduation $b$ on the scale 10, let further attainment of the two constant velocities 2X and 3X previously discussed in connection with Fig. 2 be assumed. By simply repeating the last two manipulations of the screw 7 (of Fig. 2) and the screw 7' (of Fig. 6), additional graduations $c$ and $d$ are inscribed upon the scale 10. Upon completion of this last-named step, the apparatus of Fig. 6 is rendered capable of performing exactly the same functions as those performed by the apparatus of Fig. 2.

As was the case in connection with Figs. 2 and 3, the next embodiment of the subject invention duplicates all but one of the apparatus parts of Fig. 6; i. e., only the oscilloscope 5 is replaced by a phasemeter 11. Therefore, assuming initial duplication of the frequency, the temperature, the inert fluid, and the no-marking scale conditions of Fig. 6, the twin microphone unit 3—3' is brought into in-phase positioning by simply effecting repetition of an obviously proper combination of the processes previously described in connection with the single and twin microphone units of Figs. 3 and 6. Following completion of the foregoing, the graduation $a^1$ is inscribed upon the phasemeter 11.

To obtain further graduations $b^1$, $c^1$, and $d^1$, representing, respectively, right to left fluid velocities X, 2X, and 3X, the scale-calibration process previously described in connection with Fig. 3 need only be repeated. In completed condition, the apparatus of Fig. 7 is now capable of duplicating all the functions performed by the apparatus of Fig. 3.

From the figure and descriptive disclosures already rendered in connection with the apparatus of Figs. 6 and 7, two final conclusions are obviously suggested in connection with the subject invention. Firstly, the functions performed by the apparatus of Fig. 4 will in nowise be altered if the presently shown "single" microphone 3 is replaced by the "twin" microphone unit 3—3' of Fig. 7 (it of course being additionally assumed that the aforesaid substitution includes the second amplifier 4' and the speaker-oscillator unit showing of Fig. 6). Secondly, the functions performed by the apparatus of Fig. 5 are in nowise altered by the addition of the second microphone 3' and microphone support 19', presently shown in Fig. 5, in combination with the second audio amplifier 4' of Fig. 7 and the speaker-oscillator unit showing of Fig. 6. In connection with the second conclusion stated above, it is essential that the pivot spacing of the microphone support 19' be made just twice that of the pivot spacing of the microphone support 19 from the main pivot of the linkage 24 in order that the right to left travel of the former be just twice that of the latter (for initial positioning of the microphone 3 in phase with sound wave $w^1$ and the microphone 3' in phase with sound wave $w^2$ of Fig. 1).

It does not require the addition of further figures to the subject invention to fully visualize employment, for instance, of the apparatus parts of Fig. 5 for the purpose of determining the velocity of a vehicle moving in and completely sustained by a fluid medium. If application to an airplane be desired, the bracket 26 (of Fig. 6) is so modified that it supports the microphone 1 well in advance of an unobstructed fuselage or wing portion through an aperture in the leading face of which projects the "twin" microphone units 3—3' and the exterior bulb 14 of the free-air thermometer 13 (of Fig. 5), all in proper tandem or flight alignment. There remains only mounting of the phasemeter 11 in a position convenient to pilot observation. If restricted to fuselage mounting, the apparatus parts of Fig. 4 can equally well be applied to an airplane. Under conditions of constant temperature, the same thing is true for the apparatus parts of Fig. 3.

Although the descriptions of this specification are specific to the illustrations of Figs. 1 through 7, or readily understood modifications thereof, it is to be understood that there may be departures therefrom which will still clearly fall within the field and scope of the subject invention, and I therefore do not wish to be restricted thereto, but only in so far as the appended claims are so limited.

Having thus described my invention, what I claim as new and desire to secure by Letters Patent of the United States is:

1. A device for determining the velocity of a fluid medium comprising means for emitting a note of constant freqeuncy, means predeterminately spaced aft of said first means for detecting frequency note, temperature-actuated means for selectively varying said predetermined spacing, and phase-shift-measuring means interconnected between said first-mentioned two means.

2. A device for determining the velocity of a fluid medium comprising means exposed to fluid flow and emiting a constant-frequency note, further means exposed to said flow at a selected spacing and in selected aft alignment with said first means for detecting frequency note, temperature-actuated means for varying said selected spacing between the first-mentioned two means and phase-shift-measuring means calibrated in velocity units interconnected between said first-mentioned two means.

3. A device for determining the velocity of a fluid medium comprising means for emitting a note of constant frequency, dual note-detecting means spaced different predetermined distances aft of said note-emitting means, temperature-actuated means for selectively varying said different predetermined spacings, and phase-shift-measuring means interconnected with said dual note-detecting means.

4. A device for determining the velocity of a fluid medium comprising means for emitting a note of constant frequency, note-detecting means in flow alignment with and spaced an even multiple of one wave length beyond said note emitting means under zero flow condition, temperature-actuated means for varying said even wave spacing, and phase-shift-measuring means interconnected between said first-mentioned two means.

5. A device for determining the velocity of a fluid medium comprising means for emitting a note of constant frequency, two differently slidably adjusted note-detecting means commonly mounted in flow alignment with and spaced an even multiple of one wave length from one another as well as beyond said note-emitting means under zero flow condition, temperature-actuated means for predeterminately and simultaneously varying even wave spacing between said two note-detecting means and between the last-mentioned means and said note-emiting means, and phase-shift measuring means interconnected with said two note-detecting means.

6. The method of determining the velocity of a fluid medium which consists, in setting up mechanical vibrations of constant frequency at a point along the course of fluid travel, in firstly detecting said vibrations an even number of wave lengths down course of the vibration source for a given velocity, in secondly detecting said vibrations an even but greater number of wave lengths further down course of the vibration source for a like velocity, in redetecting said first vibration detection a like number of wave lengths further down course of the vibration source for an increased velocity, in redetecting said second vibration detection a like greater number of wave lengths further down course of the vibration source for a like increased velocity, and in determining velocity increase from down course shifting of said second vibration detection with respect to initial positioning of said first vibration detection.

7. The method of determining the velocity of a fluid medium which consists, in setting up mechanical vibrations of constant frequency at a point along the course of fluid travel, in firstly detecting said vibrations an even number of wave lengths down course of the vibration source for a given velocity, in secondly detecting said vibrations an even but greater number of wave lengths further down course of the vibration source for a like velocity, in redetecting said first virbation detection a like number of wave lengths further down course of the vibration source for an increased velocity, in redetecting said second vibration detection a like greater number of wave lengths further down course of the vibration source for a like increased velocity, and in determining velocity increase from down course shifting of said second vibration redetection with respect to initial positioning of said first vibration redetection.

8. The method of determining the velocity of a fluid medium which consists, in setting up mechanical vibrations of constant frequency at a point along the course of fluid travel, in firstly detecting said vibrations an even number of wave lengths down course of the vibration source for a given velocity, in secondly detecting said vibrations an even but greater number of wave lengths further down course of the vibration source for a like velocity, in redetecting said first vibration detection a like number of wave lengths increasingly down course of the vibration source for a series of successively increasing velocities, in redetecting said second vibration detection a like greater number of wave lengths increasingly down course of the vibration source for a like series of successively increasing velocities, and in determining resulting velocity increases from corresponding down course shiftings of said second vibration detections with respect to initial positioning of said first vibration detection.

9. The method of determining the velocity of a fluid medium which consists, in setting up mechanical vibrations of constant frequency at a point along the course of fluid travel, in firstly detecting said vibrations an even number of wave lengths down course of the vibration source for a given velocity, in secondly detecting said vibrations an even but greater number of wave lengths further down course of the vibration source for a like velocity, in redetecting said first vibration detection a like number of wave lengths increasingly down course of the vibration source for a series of successively increasing velocities, in redetecting said second vibration detection a like greater number of wave lengths increasingly down course of the vibration source for a like series of successively increasing velocities, and in determining resulting velocity increases from corresponding down course shiftings of said second vibration redetections with respect to initial positioning of said first vibration redetection.

10. A device for determining the velocity of a fluid medium comprising means for emitting a note of constant-frequency, means predeterminately spaced aft of said first means for detecting frequency note, temperature-actuated means for selectively varying said predetermined spacing, and means for measuring the phase shift between said first-mentioned two means.

11. Means for determining the velocity of a fluid medium, comprising in combination, means for emitting a note of constant frequency, dual note detecting means comprising note receivers spaced in a predetermined relation from one another and from said first means, phase shift measuring means interconnected between said note receivers, and means for simultaneously moving said receivers relative to said first means at respective different rates of movement but in said predetermined relation.

12. Means as claimed in class 11 wherein the last means comprises an adjusting screw including one portion having a thread of preselected pitch cooperable to move the first receiver and another portion with a thread whose pitch is a preselected multiple of the thread pitch of the first portion and cooperable with the other receiver.

13. Means as claimed in claim 11 wherein the last means comprises temperature actuated means.

14. Means as claimed in claim 11 wherein the last means comprises temperature responsive means, and linkage interconnecting said temperature responsive means and said receivers.

NICHOLAS J. CAFARELLI, Jr.